Nov. 11, 1969  J. LERNER  3,477,290
PROBE ASSEMBLY FOR MEASURING LIQUID LEVEL
Filed Oct. 20, 1967
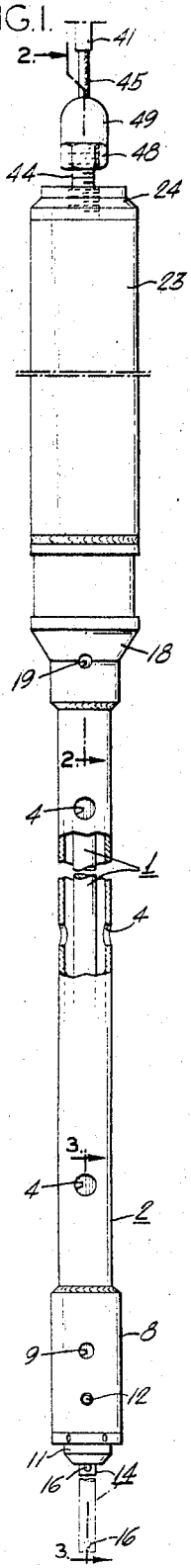
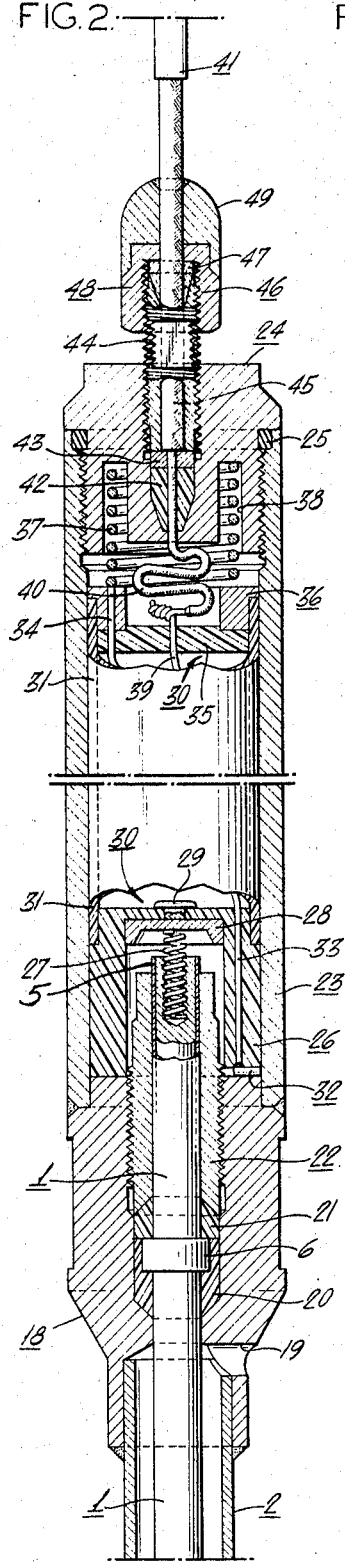
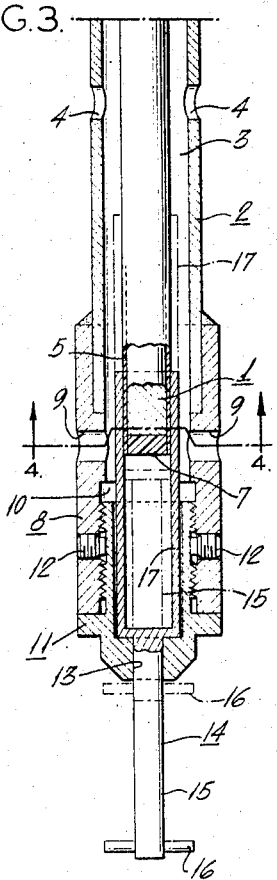
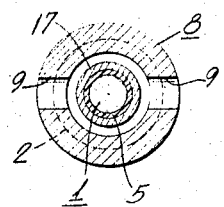
INVENTOR:
JULIUS LERNER
BY Donald R. Johnson
ATTY.

United States Patent Office 3,477,290
Patented Nov. 11, 1969

3,477,290
PROBE ASSEMBLY FOR MEASURING
LIQUID LEVEL
Julius Lerner, Broomall, Pa., assignor to Sun Oil Company, Philadelphia, Pa., a corporation of New Jersey
Filed Oct. 20, 1967, Ser. No. 676,848
Int. Cl. G01f 23/00; H01g 1/00
U.S. Cl. 73—292
10 Claims

ABSTRACT OF THE DISCLOSURE

A capacitive probe assembly for measuring liquid level has a pair of concentric elongated electrodes with an annular space therebetween, into which the liquid being measured can enter. At one end of the assembly, there is a metallic member arranged for movement into the annular space in response to the contacting of a solid body by said assembly, thereby to produce a change in the capacitance between said electrodes. A temperature sensor is provided at a location intermediate the ends of the assembly, so that the temperature of the ambient surrounding the assembly can be measured, alternatively with liquid level.

---

This invention relates to a probe assembly, particularly useful in subterranean storage caverns wherein a liquid hydrocarbon is being stored, for measuring the level of the liquid in the cavern or, in the alternative, the temperature in the liquid or vapor space of the cavern.

Speaking generally, in this invention capacitive principles are utilized for the measurement of liquid level. That is to say, variations in liquid level in a subterranean storage cavern cause variations in the electrical capacitance of a probe exposed to such liquid, and these capacitance variations are transmitted to the surface and there recorded as indicative of the liquid level in the cavern.

The storage area of a typical subterranean cavern may be about forty feet in height, so that it is desired to measure liquid levels which may vary over a total range of about forty feet. In a practical embodiment of this invention which was actually built and tested, it was found expedient to utilize a capacitive probe assembly having a measuring length on the order of 2½ feet, and to move this probe assembly up or down as necessary (by means of a follow-up driving system at the surface) to accommodate the total forty foot measuring range desired. The subterranean probe assembly is moved up and down by means of a cable attached to the upper end of the assembly (through which cable electrical signals are also transmitted to and from the probe), the cable being wound on a reel at the surface. In order to provide a continuing indication of the vertical location of the probe assembly in the cavern, a footage indicator is mechanically coupled to the cable reel. This indicator, to give an accurate reading, must be initially set or adjusted to read "zero" at the appropriate probe location, which is the bottom of the cavern; for this, it is necessary to know (at the surface) when the probe is at the bottom of the cavern. In addition to this initial adjustment of the indicator, it is desirable to check this "zero" adjustment from time to time, thereafter.

An object of this invention is to provide a novel capacitive probe assembly for measuring liquid level.

Another object is to provide a movable probe assembly having means incorporated therein for sensing the engagement of such assembly with an external solid body.

A further object is to provide a novel movable capacitive probe assembly for measuring liquid level in subterranean storage caverns.

A still further object is to provide a capacitive probe assembly for subterranean use characterized in that the engagement of such assembly with an external solid body results in a quite substantial change of capacitance which can be detected at the surface.

In the utilization of subterranean caverns for storing normally gaseous hydrocarbons under pressure, a temperature measurement is often required. Accordingly, an additional object of this invention is to provide an in-cavern probe assembly which can be used for the measurement of temperature.

Yet another object is to provide a capacitive probe assembly having a temperature sensor incorporated therein.

The objects of this invention are accomplished, briefly, in the following manner: A capacitive probe assembly, constructed and arranged for the measurement of liquid level, has incorporated therein a mechanically movable capacitive element which produces a capacitance change in the assembly upon the engagement of such element with an external solid body (and the resultant movement of such element). The aforementioned probe assembly has a temperature sensor incorporated therein, for sensing the temperature of the ambient surrounding the assembly.

A detailed description of the invention follows, taken in conjunction with the accompanying drawing, wherein:

FIG. 1 is a front elevation of a probe assembly according to this invention;

FIG. 2 is a longitudinal section taken on line 2—2 of FIG. 1 and drawn on an enlarged scale;

FIG. 3 is a longtiudinal section taken on line 3—3 of FIG. 1 and drawn on an enlarged scale; and FIG. 4 is a transverse section taken on line 4—4 of FIG. 3.

Referring now to the drawing, the active or measuring portion of the capacitive probe assembly of this invention comprises a pair of spaced, concentrically-arranged electrodes or elements, an inner element 1 and an outer element 2, between which is an annular space or region 3. The outer element 2 is an elongated metal tube (of stainless steel, for example) some thirty inches in length. Tube 2 has a plurality of transverse holes 4 therein (twenty in number, by way of example) arranged in longitudinally spaced pairs, the two holes of each pair being 180° apart and the holes in adjacent pairs being 90° apart. Holes 4 provide for the free flow of liquid into and out of the annular space 3 between the electrodes, when the assembly is positioned within a body of liquid; in this connection, it should be noted that, when the electrode assembly is in use, the common longitudinal axis of elements 1 and 2 extends in a substantially vertical direction, as illustrated in FIG. 1.

The inner element 1 is an elongated metal rod (made of stainless steel, for example) whose overall length may be some thirty-three inches. Rod 1 has a coating 5 of electrical insulating material over substantially its entire length, except for a small shoulder 6 near its upper end, to be referred to hereinafter. This coating may comprise a length of tubing made of the material known as "Teflon," which is a polymerized tetrafluoroethylene resin; this tubing is slipped over the rod 1 and then shrunk in place. A cylindrical plug 7, also made of "Teflon," is placed in contact with the lower end of rod 1 and is heat sealed to the tubing 5.

The electrode arrangement 1, 2 previously described comprises a capacitive probe assembly adapted to measure liquid level and having an active length of thirty inches. The assembly hangs or is mounted vertically in the body of liquid whose level is being measured, and this liquid enters into the annular space 3 between the electrodes by way of holes 4. The total electrical capacitance established between electrodes 1 and 2 depends on the proportion of the length of annular space 3 which is filled with liquid, and this proportion, of course, depends on the level of the liquid in the container (e.g., a cavern) in which the electrode assembly is suspended. As the liquid level in the cavern rises and falls, the liquid within annular space 3 rises and falls also (assuming that the liquid level remains within the thirty-inch measuring length of the probe), and the electrical capacitance between electrodes 1 and 2 varies correspondingly. Thus, liquid level may be measured by measuring the capacitance between electrodes 1 and 2; this will be described hereinafter with more particularly. The capacitance between electrodes 1 and 2 may vary for example from 75 to 115 picofarads, as the liquid level varies from one end of the active length of the probe assembly to the other.

A cylindrical lower housing 8 is secured as by welding to the outer tube 2, at the lower end thereof. Housing 8 is fabricated from a suitable metal, such as stainless steel. Just below the extreme lower end of tube 2, a pair of holes 9, 180° apart, are drilled through the wall of housing 8 to serve as the lowermost liquid-access holes for annular space 3; the inner diameter of housing 8 is substantially equal to that of tube 2. Just below holes 9, housing 8 has a chamber 10 of slightly enlarged diameter, and the greater portion of the length of this chamber, from the lower end of housing 8, is provided with internal threads. A hollow metallic (e.g., stainless steel) lower end plug 11, provided with male threads which mate with the female threads in chamber 10, is screwed into housing 8, and is locked in place therein by means of two set screws 12 which thread into respective diametrically-opposite transverse tapped holes in the wall of housing 8 and bear against the outer cylindrical wall of plug 11. The threaded outer surface of plug 11 is undercut to allow for the passage of the set screws 12, so that these latter can bear against a smooth cylindrical surface on plug 11.

Plug 11 has a central axial hole 13 through its lower end or cap portion, and in this hole is slidably mounted a bottom-sensing member denoted generally by numeral 14. The lower end portion of member 14, which member is preferably machined from a stainless steel rod, comprises a shaft 15 which passes slidably through the hole 13 (see FIG. 3). A stainless steel pin 16, which drivingly fits in a transverse hole provided at the lower end of shaft 15, is adapted to engage the cap portion of plug 11 to limit the upward movement of such shaft.

The upper end portion of member 14 comprises a sleeve 17 which is sized to telescope rather closely over the lower end of the inner element or electrode 1. Thus, it may be seen that the metallic sleeve 17 enters the annular space 3 between electrodes 1 and 2 when longitudinal sliding movement of member 14 occurs, that is, when this member moves into the inserted position illustrated in solid lines in FIG. 1, and in dot-dash lines in FIG. 3.

Normally, when the probe assembly 1, 2 hangs vertically within the body of liquid whose level is being measured, member 14 takes the withdrawn position illustrated in solid lines in FIG. 3, and in dot-dash lines in FIG. 1, due to gravitational force acting on this member. In this position, a considerable portion of the length of sleeve 17 fits within the hollow interior 10 of plug 11, and the downward movement of shaft 15 in hole 13 is limited by the lower end of sleeve 17 coming into engagement with the upper face of the cap portion of plug 11, adjacent hole 13. In this withdrawn position, the length of sleeve 17 which is within the annular space 3 is minimal.

When the lower end of shaft 15 comes into engagement with an external solid body, such as the floor of a subterranean cavern, member 14 is pushed or slid longitudinally upwardly toward (and eventually to) the inserted position illustrated in solid lines in FIG. 1, and in dot-dash lines in FIG. 3. The resultant movement of the metal sleeve 17 (the material of this sleeve having a high dielectric constant) upwardly, into the annular space 3 between the capacitive electrodes 1 and 2, causes an increase in the total electrical capacitance between these electrodes, and this increase can be detected at the surface. Thus, the elements 14–17 provide a longitudinally slidable means for sensing the engagement of the probed assembly with an external solid body.

A substantially cylindrical metal member 18 is secured as by welding to the outer tube 2, at the upper end thereof. Extending through its wall, member 18 has a transverse hole 19 which is located at the upper end of tube 2 and whose inner end communicates with the upper end of annular space 3; hole 19 prevents any air from becoming trapped at the upper end of this annular space.

Member 18 has a central (axial) bore therein, through which passes the upper end of the inner insulated rod 1. Above the upper end of tube 2, the central bore of member 18 is of larger diameter, and a sealing and mounting arrangement is located at the lower end of this enlarged-diameter bore. This latter arrangement includes a lower packing member 20, made of electrical insulating material such as "Teflon," which surrounds and frictionally grips the shoulder 6 on rod 1, and an upper packing member 21, made of this same material, whose lower end bears against the upper face of shoulder 6. Members 20 and 21 are held in firm sealing engagement with shoulder 6, and with adjacent portions of rod 1, by means of a centrally-bored seal nut 22, made of stainless steel, whose lower end engages and presses against the upper end of member 21. Nut 22 carries external threads which engage internal threads provided at the upper end of the enlarged-diameter bore of member 18. The upper end of the insulated rod 1, above member 21, passes through the bore of nut 22.

The lower end of an elongated cylindrical metal shell 23 is welded to the upper end of member 18. At its upper end, the inner wall of shell 23 carries threads which engage external threads carried by an upper metallic end cap 24, an O-ring gasket 25 being utilized between the upper end of the shell and cap 24. Cap 24 closes the upper end of shell 23, and also provides a facility whereby a cable may be connected to the probe assembly, as well as to other components located inside this shell. This will be explained later in more detail (see FIG. 2).

A cup-shaped member 26, made of a suitable electrical insulating material such as "Teflon," is positioned bottom-up against the upper face of member 18, the side wall of the cup 26 surrounding the upper end of nut 22 (and also, of course, the upper end of rod 1), and the upper end of rod 1 being spaced from the lower face of the end wall of the cup. The upper end face of rod 1 is not covered by the insulating tubing 5, so that this upper end face is bare metal. An axially-extending tapped hole is provided in the upper end of rod 1, and one end of a compression spring 27 (made from stainless steel which has been gold-plated, for example) is screwed into the threads of this hole, to make good electrical contact with metallic rod 1. This spring thus provides the "insulated" or "ungrounded" contact to the capacitor 1, 2; the outer tube 2 is "grounded."

The opposite end of spring 27 bears against a dish-shaped metallic contact 28 which is positioned at the end wall of cup 26. A metallic contact button 29 extends through the end wall of cup 26 into engagement with contact 28, and one end of a wire (not shown) is connected to the upper face of button 29, thereby to connect the inner elemet 1 of the capacitive probe to a remote transmitter unit indicated generally by numeral 30. Unit 30 consists of a plurality of interconnected electronic components which are suitably mounted within a cylindrical chamber above cup 26, the side wall of this chamber being defined by a sleeve 31 of electrical insulating material (such as the methyl methacrylate synthetic resin known as "Lucite") which is mounted within shell 23, above cup member 26.

The circuitry utilized in the capacitance-responsive portion of unit 30 may be substantially the same as that utilized in the "tank assembly" of Shawhan Patent No. 3,073,160, dated Jan. 15, 1963. It will be explained hereinafter how the "ground" connections are made to unit 30 and to tube 2.

A small recess is provided in the lower face of the side wall of cup 26, and in this recess is mounted a temperature sensor 32 (see FIG. 2), such as a so-called thermistor. This temperature sensor is in direct contact with the upper face of metallic member 18, and, since the outer surface of member 18 is directly exposed to the ambient surrounding the outer element 2, it can be stated that the sensor 32 is thermally coupled to this outer element (member 18 forming, in effect, a continuation of outer element 2), for sensing the temperature of the ambient surrounding said outer element. Thermistor 32 has a pair of output leads contained in a cable 33. Cable 33 extends upwardly from thermistor 32, through the insulating cup 26, to unit 30. One of the two leads in cable 33 is connected to the internal "ground" of unit 30, and the other to a suitable "ungrounded" point in unit 30. This enables temperature readings to be taken when desired (alternatively to liquid level readings).

The common or "ground" wire 34 of unit 30 passes through a disc 35 of electrical insulating material (e.g., "Teflon") which is mounted at the upper end of unit 30, within sleeve 31. Wire 34 passes through the outer portion of a metal ring 36 which abuts the upper end of sleeve 31, and which contacts at its outer periphery the shell 23. Ground wire 34 is soldered to ring 36. One end of a metallic compression spring 37 (which, like spring 27, may be gold-plated) bears against the upper face of ring 36, and the other end of this spring bears against the inner (or lower) face of end cap 24, a considerable portion of the length of this spring being located within an annular groove 38 cut into the underside of cap 24. By way of items 34, 36, and 37, an electrical "ground" connection is completed from unit 30 to the upper metal cap 24. As previously described, tube 2 is welded to member 18, the latter is welded to shell 23, and shell 23 is threadedly joined to end cap 24; this forms a metallic "ground" connection between the outer probe 2 and end cap 24.

The "ungrounded" wire 39 from the end of unit 30 opposite to probe electrode 1 passes through disc 35 and is then electrically connected, within the empty or void interior space of ring 36, to one end of the central conductor 40 of a cable 41. Cable 41 transmits electrical signals between the probe assembly and the surface (if the probe assembly is being used in a subterranean cavern), and in addition serves to mechanically support or suspend the probe assembly in the cavern. Cable 41 is preferably an armor shielded cable, in which the armor shield can serve as a "grounded" shield around the inner cable conductor 40.

The insulated or unstripped lower end of the central conductor 40 of cable 41 (from which the armor shield has been cut away for a distance of approximately two inches from the lower end of the cable) passes through a sealing arrangement provided in a central boss on the lower side of end cap 24. This sealing arrangement is mounted within an appropriate central aperture in cap 24, and comprises a lower somewhat frusto-conical apertured plug 42 of electrical insulating material such as "Teflon," and an upper apertured steel follower 43, the insulated central conductor of the cable passing through the apertures in items 42 and 43. The plug 42 is tightened into sealing position around the cable conductor and within cap 24 by means of an elongated externally-threaded metal gland member 44, whose lower end bears against the upper end of follower 43 and which threads into a tapped central aperture provided in end cap 24. Gland 44 threads into cap 24 (as stated), and closely surrounds the armor shield 45 of cable 41, thereby completing the electrical "ground" connection from cap 24 to the cable shield conductor 45.

The mechanical (and electrical) connections between armor shield 45 and gland 44 are completed by means of a front metallic ferrule 46, a back metallic ferrule 47, and a nut 48. The front ferrule 46 is frusto-conical and fits within a conical opening provided at the upper end of gland 44; this ferrule closely surrounds armor shield 45. The back ferrule 47 engages the upper end of ferrule 46 and also closely surrounds armor shield 45. Nut 48, to which a bullnose 49 is added by welding, has threads which engage threads provided on the upper end of gland 44, and bears against the upper end of ferrule 47. Nut 48 is tightened on gland 44 so that the ferrules 46 and 47 clamp the cable 41 as illustrated in FIG. 2.

What is claimed is:

1. A capacitive probe assembly for measuring liquid level comprising an elongated inner conducting element of circular outer configuration, a concentrically-arranged elongated outer tubular conducting element spaced from said inner element to provide an annular space between said elements into which space liquid can enter, and a member located adjacent one end of said elements and mounted for longitudinal sliding movement relative thereto, said member including a body of conducting material constructed and arranged to enter said annular space.

2. Assembly according to claim 1, wherein said body is a metallic sleeve which telescopes over said inner conducting element in response to sliding movement of said member in one direction.

3. Assembly according to claim 1, wherein said member is mounted at one end of said probe assembly and moves longitudinally with respect thereto in response to engagement of said member with an external solid body.

4. Assembly defined in claim 3, characterized in that said body is a metallic sleeve which telescopes over said inner conducting element in response to engagement of said member with an external solid body.

5. Assembly set forth in claim 1, wherein said outer element has a plurality of apertures through its wall to provide for the entry of liquid into said annular space.

6. Assembly in accordance with claim 1, including also means coupling said inner and outer conducting elements to an electrical measuring circuit.

7. Assembly set forth in claim 1, wherein said inner element is electrically insulated from said outer element, thereby to establish an electrical capacitance therebetween the value of which is dependent in part upon the proportion of said annular space which is filled with liquid.

8. Assembly defined in claim 7, characterized in that the value of said electrical capacitance is dependent also upon the extent to which said body of conducting material has entered into said annular space.

9. Assembly in accordance with claim 8, including also electrical connections coupled to said inner and outer conducting elements for enabling measurement of the electrical capacitance therebetween.

10. Assembly in accordance with claim 1, including also a temperature sensor thermally coupled to said outer element for sensing the temperature of the ambient surrounding said outer element.

References Cited

UNITED STATES PATENTS

| | | | |
|---|---|---|---|
| 2,582,400 | 1/1952 | Smith | 73—304 |
| 2,377,275 | 5/1945 | Smith | 73—304 |
| 3,213,360 | 10/1965 | Cook et al. | 317—246 |
| 3,098,183 | 7/1963 | Mitchell | 317—246 |

S. CLEMENT SWISHER, Primary Examiner

U.S. Cl. X.R.

73—304; 317—256